United States Patent [19]

Kokkonen et al.

[11] Patent Number: 4,769,986
[45] Date of Patent: Sep. 13, 1988

[54] APPARATUS FOR WASHING CELLULOSE WITH A ROTARY DRUM

[75] Inventors: Seppo Kokkonen; Harri Qvintus, both of Savonlinna, Finland

[73] Assignee: Enso-Gutzeit OY, Helsinki, Finland

[21] Appl. No.: 921,786

[22] Filed: Oct. 21, 1986

[30] Foreign Application Priority Data

Oct. 31, 1985 [FI] Finland ................................. 854287

[51] Int. Cl.⁴ .......................... D21C 9/02; D21C 9/06
[52] U.S. Cl. ..................................... 68/181 R; 8/156; 162/60; 162/380; 210/392; 210/404
[58] Field of Search .................... 162/60, 380, 232; 210/327, 392, 402, 409, 404; 68/22 R, 45, 181 R, 158, 148, 18 F; 8/156

[56] References Cited

U.S. PATENT DOCUMENTS

| | | | |
|---|---|---|---|
| 4,154,687 | 5/1979 | LaValley | 210/392 |
| 4,266,413 | 5/1981 | Yli-Vakkuri | 162/380 |
| 4,292,123 | 9/1981 | Lintunen | 162/60 |
| 4,502,171 | 5/1985 | Koskinen | 162/60 |

FOREIGN PATENT DOCUMENTS

| | | | |
|---|---|---|---|
| 921323 | 12/1954 | Fed. Rep. of Germany | 210/392 |
| 56564 | 2/1980 | Finland . | |
| 56865 | 4/1980 | Finland . | |

*Primary Examiner*—Steve Alvo

*Attorney, Agent, or Firm*—Toren, McGeady & Associates

[57] ABSTRACT

An apparatus for washing cellulose, wherein the cellulose is conducted through between a rotary drum and a stationary shell encircling it, in the form of a layer supported by the permeable mantle surface of the drum. The principle of operation of the apparatus is: conducting washing liquid through the shell, through compartments located under the mantle surface of the drum and serving as washing liquid collectors, and through a valve system composed of a rotary part associated with the drum and a stationary part placed thereagainst, several times through the cellulose layer so that when the apparatus is operating the washing liquid at the same time moves in the direction opposite to the direction of rotation of the drum, stepwise, through the apparatus. It is essential in the invention that the valve system is composed of annular parts located at one end of the drum, their radius substantially equalling that radius on which the compartments under the mantle surface of the drum are located from the shaft of the drum, and that the part of the valve system rotating along with the drum comprises an aperture by which the ends of the compartments are joined to the valve system. By this design, the delay occurring in the washing liquid transfer has been reduced and the controllability of the washing process has been improved.

1 Claim, 3 Drawing Sheets

APPARATUS FOR WASHING CELLULOSE WITH A ROTARY DRUM

BACKGROUND OF THE INVENTION

The present invention concerns an apparatus for washing cellulose, comprising a rotary drum with a liquid-permeable mantle surface; a stationary shell parallelling the shaft of said drum and encircling the drum in such manner that the cellulose that is being washed can pass through between the drum and the shell in the form of a layer lying against said mantle surface and through which the washing liquid can be introduced in the cellulose layer; and washing liquid input conduit which has been connected to the shell close to the washed cellulose removal point; compartments under the mantle surface of the drum in which the washing liquid that has been drained through the cellulose layer accumulates; a valve system connected to said compartments, consisting of a part rotating along with the drum and a stationary part lying against it; conduits starting at said stationary part and communicating, when the apparatus is in operation, with different compartments of the drum and connecting at different points on the shell encircling the drum so that during operation the washing liquid can be conducted several times through the cellulose layer at various points thereof and moving stepwise in the direction opposite to the direction of rotation of the drum; and a removal conduit starting at said stationary part and through which the washing liquid can be removed from the apparatus.

An apparatus of the kind described is known in the art e.g. through the Finnish Patent publications No. 56564 and No. 56865. In the types of apparatus disclosed in these references, the cellulose in conducted through between a rotating drum and a shell encircling same, in the form of a continuous web, through which the washing liquid is conducted several times by pressure produced by one single pumping operation. In a design of this kind, one is able to manage with a rather small quantity of washing liquid, and no detrimental internal movement of fibres relative to each other will occur in the web during the process.

In said types of apparatus of prior art, transfer of the washing liquid from one washing step to another, i.e., the returning of washing liquid that has been drained through the cellulose web lying against the drum and accumulated in the compartments under the shell surface of the drum, back to the shell encircling the drum to be once more conducted through the web, takes place by employing a valve consisting of a disk-like member located at one end of the drum and encircling the drum shaft, this member comprising a stationary part and a part rotating along with the drum and lying against it. The compartments collecting washing liquid, located under the shell surface of the drum and which parallel the shaft of the drum and having their bottoms sloping towards the center of the drum, have been connected at their centers through conduits with the rotating part of said valve. The stationary part of the valve, again, is connected through conduits with various point on the shell encircling the drum so that the desired stepwise transfer of the washing liquid in the direction opposite to the direction of rotation of the drum is accomplished.

The valve design of the type described above, which has been used in apparatus of prior art, has turned out in practice to be unsatisfactory. Its most salient drawback is the delay in the transfer of the washing liquid from one step to the other, caused by the required, comparatively long conduits. This delay detracts from the capacity of the apparatus, and it impedes accurate control of the washing process. Moreover, the large quantity of washing liquid carried in the conduits between the drum compartments and the rotary part of the valve causes in connection with the "phase shifts" also mixing of liquid between different steps, whereby the washing result is impaired.

OBJECT OF THE INVENTION

The object of the invention is to devise a design wherein said drawbacks of the valve construction of prior art have been avoided. The invention is characterized in that the valve system incorporated in the apparatus consists of annular parts located at the end of the drum and having a radius substantially equal to the radius on which the compartments under the shell surface of the drum are located, with reference to the shaft of the drum, and that the part of the valve system rotating along with the drum comprises apertures by which the ends of the compartments connect with the valve system.

In the design of the invention, nearly complete elimination of the conduits between the compartments under the surface of the drum and the rotary part of the valve has been achieved, in addition to which the conduits between the stationary part of the valve and the shell encircling the drum are also shorter than before. The transfer of the washing liquid that has accumulated in the compartments, to the valve system, may further be ensured by making the bottoms of said compartments sloping towards that end of the drum where the system is located.

BRIEF DESCRIPTION OF THE DRAWINGS

The invention is described, in the following, in greater detail with the aid of an example and referring to the attached drawings, wherein.

DETAILED DESCRIPTION OF THE PREFERRED EMBODIMENT

Figure 1:
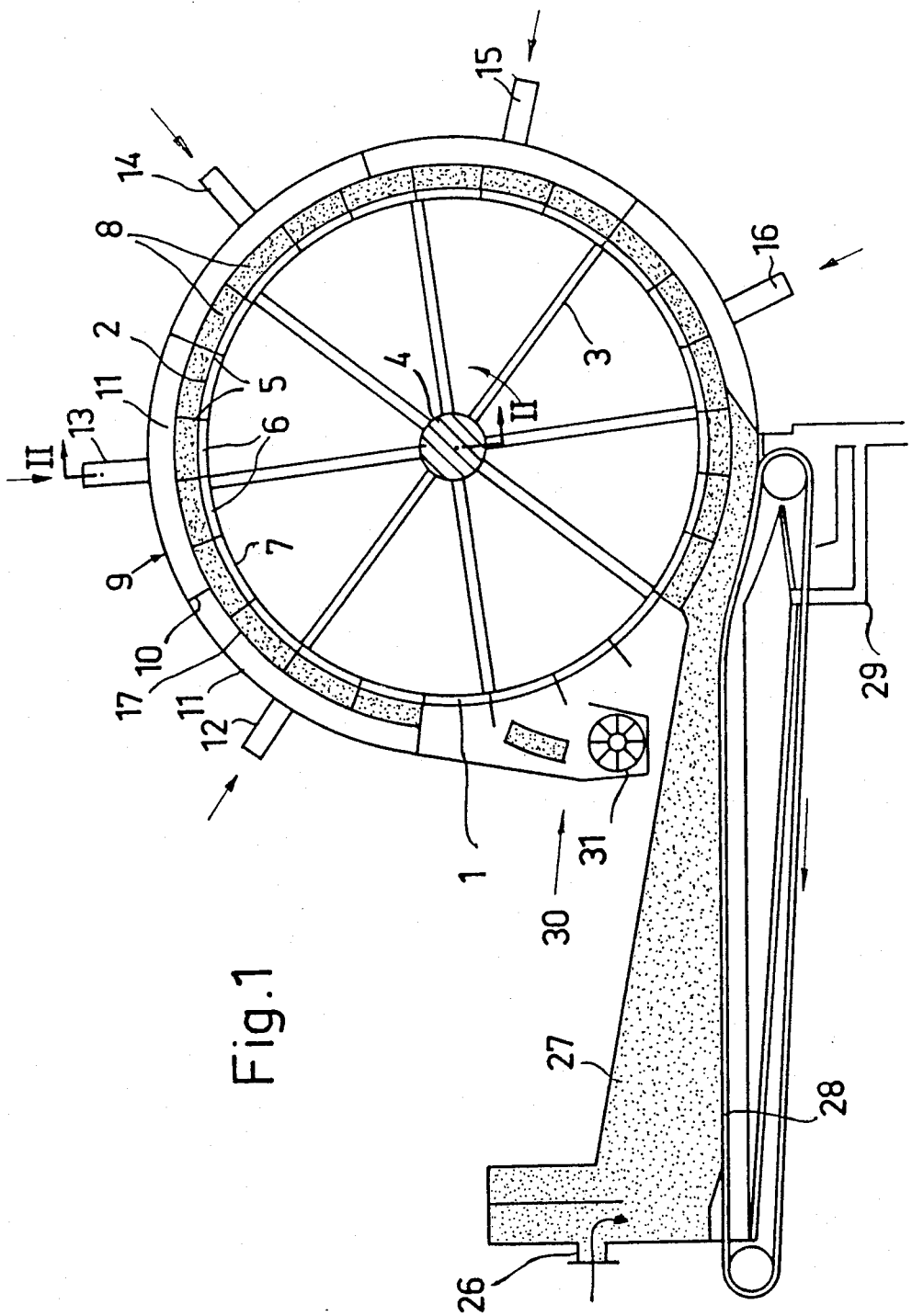
FIG. 1 presents the cross section of an apparatus according to the invention.

The apparatus depicted in the drawings comprises a cylindrical drum 1, its mantle surface 2 being connected by radial rods 3 to a horizontal shaft 4. The mantle surface 2 is most appropriately composed of wire fabric permeable to liquid. Under the mantle surface 2 longitudinal compartments 6 have been formed, which are mutually separated by partitions 5 parallelling the shaft 4 of the drum, their bottoms 7 sloping towards one end of the drum, as can be seen in FIG. 2. Said partitions 5 continue, as shown in FIG. 1, on the outside of the shell surface 2 of the drum 1 in such manner that they divide the cellulose that is being washed and that has been positioned against the shell, into cakes 8 of substantially rectangular shape.

Figure 2:
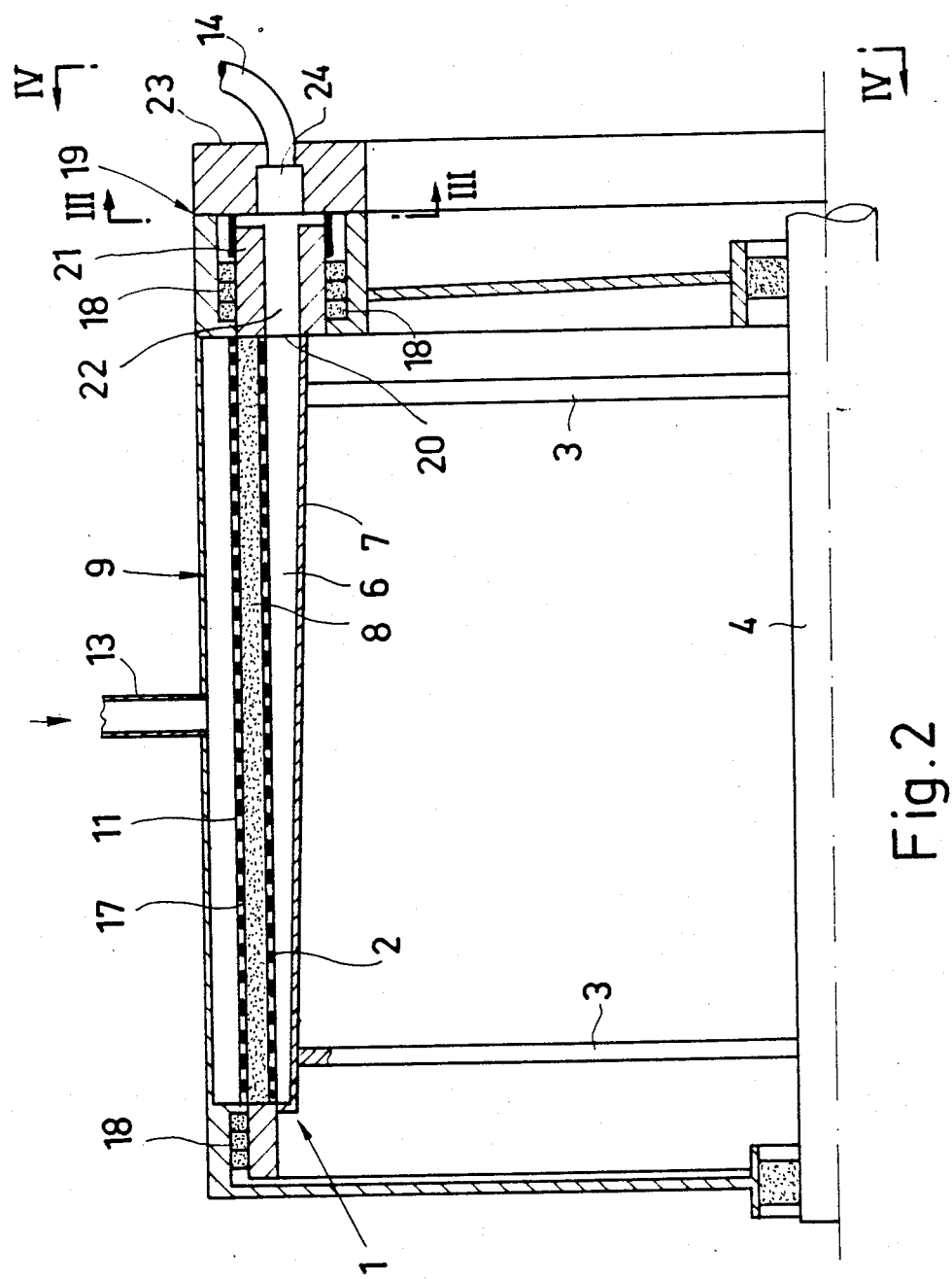
FIG. 2 presents a longitudinal section of part of the apparatus, this being the section II—II of FIG. 1.

The drum 1, which rotates about the axis of its shaft 4 as indicated by the arrow A in FIG. 1, is encircled by a stationary shell 9, which constitutes a substantially cylindrical envelope parallelling the shaft 4. The shell 9 is composed, as seen in FIG. 1, of five housings 11 separated by partitions 10 parallelling the shaft 4 of the drum and to each such housing connecting an input conduit, 12-16, for the washing liquid empoyed in washing the cellulose. The bottom 17 of said housings 11, located against the cellulose layer 8 being washed and supported in this position by the mantle surface 2 of the drum, consists of perforated sheet material permeable to liquid. The joining of the rotating drum 1 and the stationary shell 9 is to be seen in FIG. 2, where the packings provided at the junctures carry the reference numeral 18.

Figure 3:
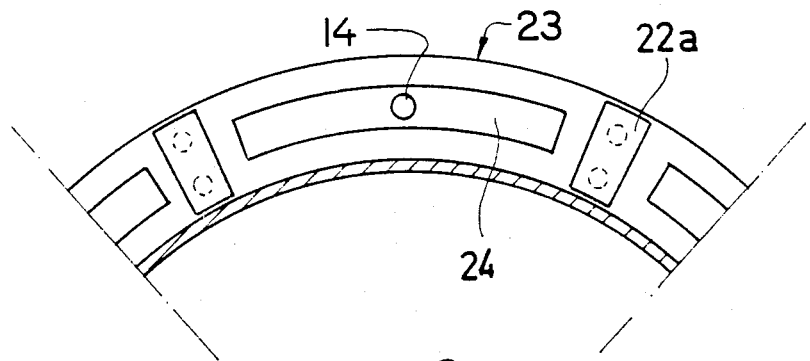
FIG. 3 presents the stationary part of the valve system belonging to the apparatus, as section III—III of FIG. 2.
Figure 4:
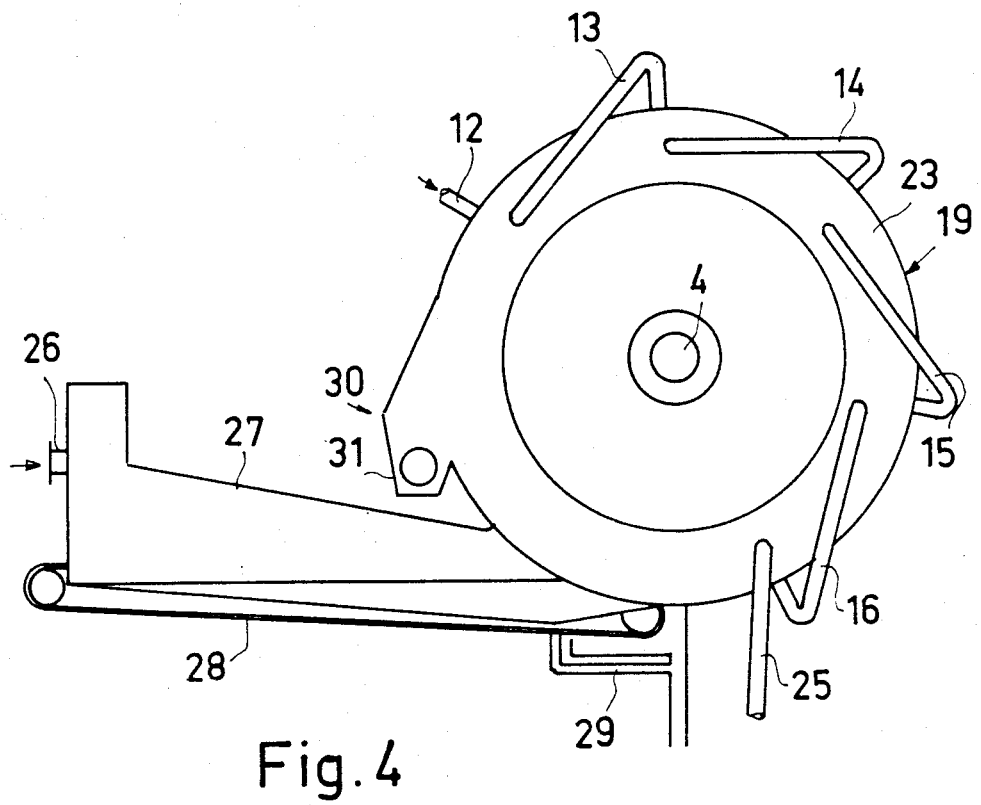
FIG. 4 presents, in a manner equivalent to that in FIG. 1, the end of the apparatus.

The principle of operation of the apparatus here presented is that the washing liquid that is being used is conducted several times through the cellulose layer 8 lying against the mantle surface 2 of the drum, so that at the same time the washing liquid passes through the apparatus, moving stepwise in the direction opposite to the direction of rotation of the drum 1. To this purpose, the apparatus has been provided with a valve system 19 on one end of the drum 1, this valve system communicating by apertures 20 with the compartments 6 under the mantle surface 2 of the drum, in which compartments the washing liquid drained through the cellulose layer accumulates. The valve system 9 comprises an annular part 21, integrally associated with the drum 1 and rotating along therewith, and which constitutes a straight continuation of the compartments 6; that is, the radius of this part is substantially equal to the radius on which the compartments are located with reference to the shaft 4 of the drum. Said part 21 comprises an annular space 22, divided by sealing pieces 22a into subdivisions so that each subdivision communicates, through apertures 20, with several consecutive compartments 6. The valve system 19 furthermore comprises an annular stationary part 23 lying against said part 21 associated with the drum 1 and having substantially equal radius with it, and this stationary part being integrally associated with the shell 9 encircling the drum 1. The part 23, depicted in FIG. 3, comprises chambers 24 in direct communication with the subdivisions 22 belonging to the part 21, these chambers being disposed to form a ring running around the part 23. At these chambers start the before-mentioned washing liquid input conduits 13-16 connected to the housings 11 in the shell 9. Moreover, at that chamber 24 which is first in the direction of travel of the cellulose that is being washed starts a conduit 25 (see FIG. 4) which serves as washing liquid removal conduit.

The cellulose which one desires to wash in the apparatus is supplied in the form of fiber pulp at consistency about 1–10%, through the input connector 26 into the input box 27, whence a conveyor wire 28 feeds it onto the mantle surface 2 of the drum 1, while at the same time part of the liquid contained in the pulp is separated and goes into the save-all 29. Hereby a fiber layer 8 is formed on the mantle surface of the drum, which has solid matter content between 8 and 12% and which passes, conveyed by the drum 1, between the drum and the shell 9, through consecutive washing steps, to the washed cellulose removal end 30, where the cellulose is detached from the mantle surface 2 of the drum, e.g. by means of compressed air blowing, to end up in the channel 31. While the cellulose 8 is passing through between the drum 1 and the shell 9, washing liquid is conducted through the input conduit 12 in the first place into the housing 11 located closest to the cellulose removal end 30, the liquid being pressed through the perforated bottom 17 of said housing into the cellulose layer and further being drained through the mantle surface 2 of the drum, into the compartments 6 serving as washing liquid collectors. From the compartments 6, the washing liquid goes into the subdivision 22 which is in register, in the part 21 of the valve system 19 associated with the drum, and thence further into the opposed chamber 24 in the stationary part 23 of the valve system. From the chamber 24, the washing liquid goes by the conduit 13 to the next housing 11 in the shell 9 encircling the drum, whence it is again drained through the cellulose layer 8 in the manner just described. In this way the washing steps are identically repeated until the washing liquid escaping at the housing 11 which is the last one in the shell, i.e., which lies closest to the cellulose input end, is carried from the valve system to the drain conduit 25.

It is obvious to a person skilled in the art that different embodiments of the invention are not confined to the example that has been presented and that they may instead vary within the scope of the claims following below.

We claim:

1. Apparatus for washing cellulose, comprising a rotary drum with a shaft and a liquid-permeable mantle surface; a stationary shell parallelling the shaft of said drum and encircling the drum in such manner that the cellulose that is being washed can pass through between the drum and the shell in the form of a layer lying against said mantle surface and through which the washing liquid can be introduced in the cellulose layer, the shell having a washed cellulose removal outlet; a washing conduit connected to the shell close to the washed cellulose removal outlet; compartments under the mantle surface of the drum in which the washing liquid that has been drained through the cellulose layer accumulates; a valve system connected to said compartments, comprising a rotating part rotating along with the drum and a stationary part lying against said rotating part, said parts being annular parts located on the end of the drum and having a radius from the shaft of the drum substantially the same at that radius on which the compartments under the mantle surface of the drum are located from the shaft of the drum, and the part of the valve system rotating along with the drum forming an annular space by which the ends of the compartments connect with the valve system; conduits starting at said stationary part of the valve system and communicating with different compartments of the drum and connecting at different circumferential portions of the shell encircling the drum so that the washing liquid can be conducted several times through the cellulose layer at various points thereof and moving stepwise in the direction opposite to the direction of rotation of the drum, wherein each of said conduits has one end connected to said stationary part and an opposite end connected to said shell and communicating with said rotary drum, said opposite ends of said conduits being circumferentially spaced around said shell with said first mentioned end being upstream of said opposite end with respect to the direction of rotation of said drum; and a removal conduit starting at said stationary part and through which the washing liquid can be removed from the apparatus.

* * * * *